(12) United States Patent
Tamura et al.

(10) Patent No.: US 8,118,355 B2
(45) Date of Patent: Feb. 21, 2012

(54) VEHICULAR SIDE BODY STRUCTURE

(75) Inventors: Naoyuki Tamura, Wako (JP); Koji Satoh, Wako (JP); Hiroaki Ueno, Wako (JP); Takeharu Endo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 12/616,969

(22) Filed: Nov. 12, 2009

(65) Prior Publication Data
US 2010/0123337 A1 May 20, 2010

(30) Foreign Application Priority Data

Nov. 17, 2008 (JP) ................. 2008-293569
Nov. 17, 2008 (JP) ................. 2008-293585
Jul. 29, 2009 (JP) ................. 2009-176856

(51) Int. Cl.
*B62D 25/00* (2006.01)

(52) U.S. Cl. ................. 296/209; 296/193.05

(58) Field of Classification Search ............. 296/203.03, 296/209, 187.01, 187.03, 187.12, 203.01, 296/203.02, 193.05
See application file for complete search history.

(56) References Cited

U.S. PATENT DOCUMENTS

| | | | |
|---|---|---|---|
| 2,997,329 A * | 8/1961 | Chapman .................. 296/191 |
| 3,132,891 A * | 5/1964 | Pyuro et al. ............... 296/204 |
| 4,440,434 A * | 4/1984 | Celli ........................ 296/181.2 |
| 6,409,257 B1 * | 6/2002 | Takashina et al. ......... 296/209 |
| 6,540,259 B2 * | 4/2003 | Sugimoto et al. ......... 280/751 |
| 2002/0043821 A1 * | 4/2002 | Takashina et al. ...... 296/203.03 |
| 2006/0043774 A1 * | 3/2006 | McNulty et al. ........... 296/209 |
| 2007/0187995 A1 * | 8/2007 | Mouch et al. .............. 296/209 |

FOREIGN PATENT DOCUMENTS

JP    2000-095151    4/2000

* cited by examiner

*Primary Examiner* — Glenn Dayoan
*Assistant Examiner* — Pinel Romain
(74) *Attorney, Agent, or Firm* — Rankin, Hill & Clark LLP

(57) ABSTRACT

Outer side sill member includes an upper wall section slanting upward in a horizontal, outer-to-inner direction, and a lower wall section slanting downward in the horizontal, outer-to-inner direction. At least one of upper and lower wall sections of the outer side sill member has a channel-shaped bead extending along the side sill, so that the side sill has a polygonal closed sectional shape extending in the front-rear direction of the vehicle. The bead has a bottom portion having a width greater than a vertical dimension in a direction orthogonal to the surface of the bottom portion. Each of bulkheads, partitioning the interior of the side sill, is fixedly joined to the outer side sill member with its recessed edge portion substantially fittingly engaging with the bottom portion of the depressed wall portion of the outer side sill member.

14 Claims, 10 Drawing Sheets

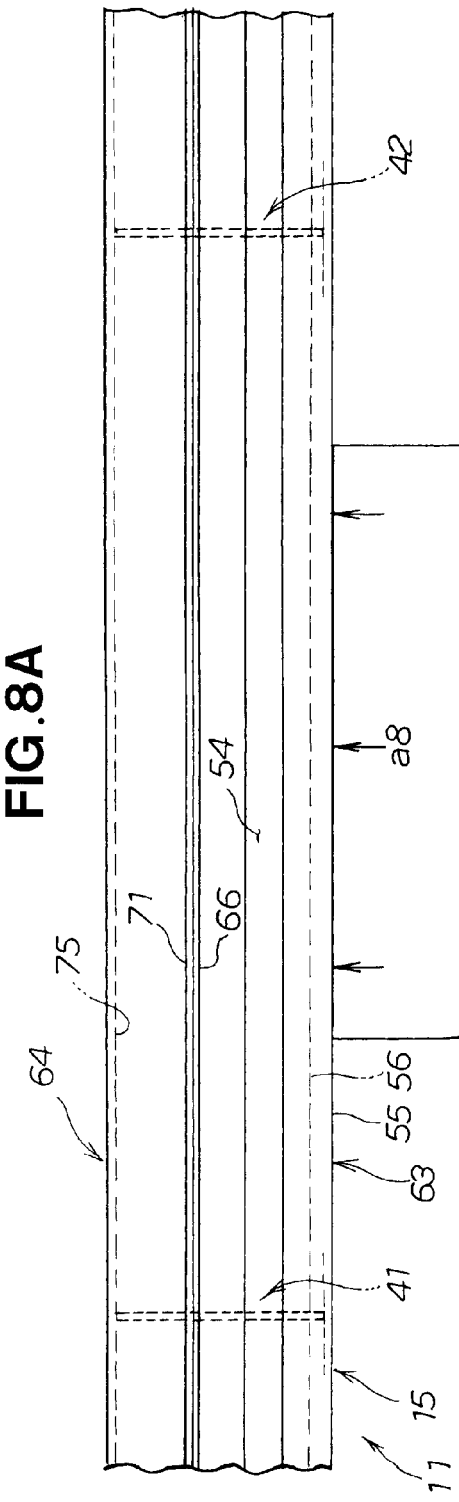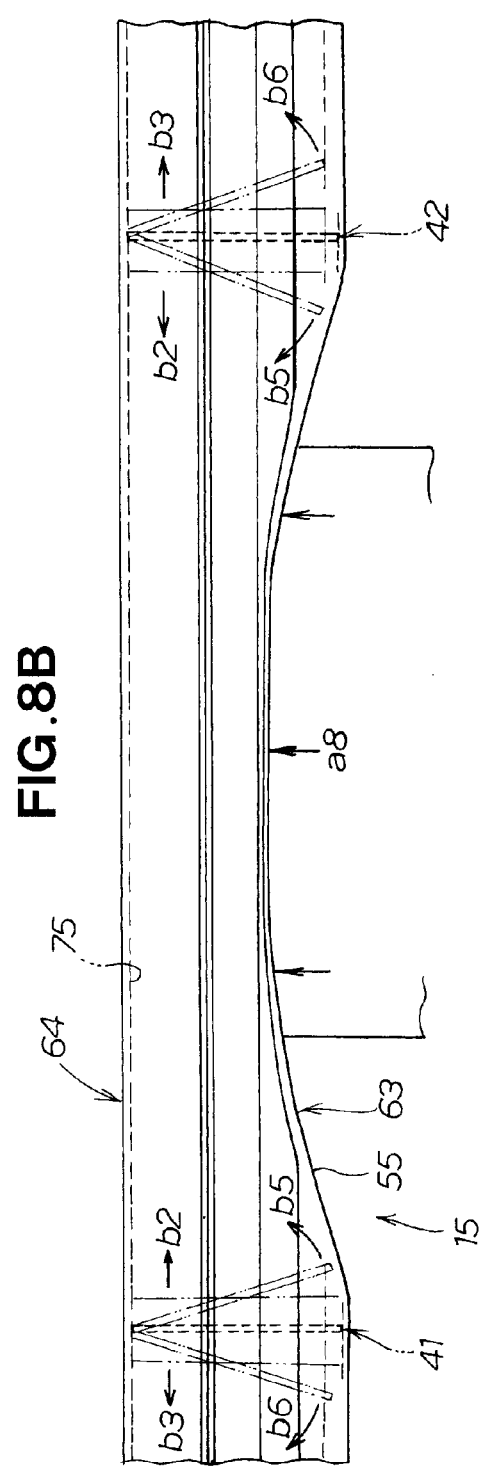

VEHICULAR SIDE BODY STRUCTURE

FIELD OF THE INVENTION

The present invention relates to a vehicular side body structure provided to extend continuously on each of left and right sides of a floor of a passenger compartment of a vehicle.

BACKGROUND OF THE INVENTION

Among the conventionally-known types of vehicular side body structures is the type where a reinforcing depressed portion is formed in each of left and right side sills, provided on left and right side edge portions of a floor of a passenger compartment and extends in a front-rear direction of the vehicle so as to prevent sectional buckling of the side sill. One example of such a type of vehicular side body structure is disclosed in Japanese Patent No. 3528624.

Although the vehicular side body structure disclosed in the 3528624 patent is constructed to prevent any of the side sills from bending toward the interior of the passenger compartment when a load has been applied to a side surface of the vehicle due to, for example, a lateral collision with an external object, there is a need to more reliably prevent the side sill from bending toward the interior of the passenger compartment. Further, the provision of the reinforcing depressed portions provided in the left and right side sills would add to the weight of the vehicle body. Furthermore, with the vehicular side body structure disclosed in the 3528624 patent, there is another need to more reliably increase an axial compressive strength of the side sills against a load applied to the front of the vehicle due to, for example, a frontal collision.

SUMMARY OF THE INVENTION

In view of the foregoing prior art problems, it is an object of the present invention to provide an improved vehicular side body structure which can achieve an increased axial compressive strength of the side sills against a load applied to a front surface of the vehicle (frontal collision) and an increased bending strength of the side sills against a load applied to a side surface of the vehicle (lateral collision), and which can be manufactured with ease.

It is another object of the present invention to provide an improved vehicular side body structure which can achieve an enhanced anti-lateral-collision performance and achieve an increased strength and rigidity of a side body of the vehicle.

In order to accomplish the above-mentioned objects, the present invention provides an improved vehicular side body structure, which comprises left and right side sills disposed on left and right side edge portions of a floor of a passenger compartment of a vehicle, left and right front pillars each extending from a front portion of the left or right side sill to a roof, left and right center pillars each extending from a middle portion of the left or right side sill to the roof. Each of the left and right side sills comprises an outer side sill member and an inner side sill member fixedly joined with each other in such a manner that the side sill has a closed sectional shape extending in a front-rear direction of the vehicle. The outer side sill member includes an upper wall section slanting upward in a horizontal, outer-to-inner direction of the passenger compartment, and a lower wall section slanting downward in the horizontal, outer-to-inner direction of the passenger compartment. At least one of the upper and lower wall sections has a bead formed therein and extending from the front end to the rear end of the side sill, so that the side sill has a polygonal closed sectional shape extending in the front-rear direction of the vehicle. The bead has a width, which is a dimension, between the outer end and the inner end of a bottom portion thereof, greater than a vertical dimension thereof in a direction orthogonal to the bottom surface of the bottom portion.

By the provision of the bead formed in at least one of the upper and lower wall sections and extending from the front end to the rear end of the side sill, the side sill has a polygonal closed sectional shape extending in the front-rear direction of the vehicle. Further, the bead has a width greater than the vertical dimension (depth) in the direction orthogonal to the surface of the bottom portion, and thus, when a load produced by a lateral collision with an external object has been input, the load transmits in a direction where the upper and lower walls would deform or crush without falling down or collapsing. As a result, the vehicular side body structure of the present invention can achieve an increased strength against a lateral collision load. Further, because the bead is provided in at least one of the upper and lower wall sections to extend in a longitudinal or front-to-rear direction of the vehicle, which is orthogonal to the direction where the upper and lower walls would vertically deform, the vehicular side body structure of the present invention can achieve a significantly increased strength against a lateral collision load.

Preferably, the outer side sill member further has a side bead formed in a vertical wall section integral with the upper and lower wall sections and facing outwardly of the vehicle, the side bead extending from the front end to the rear end of the side sill so that the side sill has a multi-polygonal closed sectional shape extending in the front-rear direction of the vehicle. Thus, the vehicular side body structure of the present invention can achieve an increased axial compressive strength of the side sills against a frontal collision and an increased bending strength of the side sills against a lateral collision.

Preferably, each of the beads formed on at least one of the upper and lower wall sections and the side beam formed in the vertical wall section has at least four edge lines. Thus, the outer side sill member has a total of twelve edge lines when such a bead is formed in each of the upper, lower and vertical wall sections. With such a great number of the edge lines, a load applied to the front end of the side sill due to a frontal collision can be dispersed to the individual edge lines, so that the side sill can have an increased axial compressive strength. Further, because a load applied to a side surface of the vehicle due to a lateral collision acts in a direction where it might crush the upper and lower wall sections, it is conceivable that the bending strength of the outer side sill member would decrease; actually, however, the four or more side edges of each of the beads can also effectively increase the bending strength of the side sill. Thus, the side sill can be effectively prevented from being crushed due to a frontal collision or lateral collision, so that an appropriate interior space of the passenger compartment can be maintained despite the collision. More specifically, for a same material and same wall thickness, the side sill in the present invention can have an axial compressive strength that is about 2.3 times greater than that of the conventionally-known vehicular side body structure and a bending strength that is about 2.5 times greater than that of the conventionally-known vehicular side body structure.

Preferably, the outer side sill member is formed of a high-tension steel plate. Thus, the outer side sill member can have a reduced wall thickness and hence a reduced weight. By using the high-tension steel plate and forming each of the edge lines at a minimum possible curvature determined in accordance with the strength and thickness of the thin high-tension steel plate, the outer side sill member can have an even further reduced wall thickness and increased strength.

Preferably, the outer side sill member is formed to provide the polygonal closed sectional shape by roll forming or bend forming, undercut portions to be formed by press forming, such as the bead of the upper or lower wall section can be formed with ease.

Preferably, the bead formed in the at least one of the upper and lower wall sections of each of the side sills is in the form of a depressed wall portion of a generally channel sectional shape depressed toward the interior of the side sill, and a lower portion of at least one of the front pillar and the center pillar corresponding to the side sill overlaps the at least one of the upper and lower wall sections to close the depressed wall portion, so that the bead has a closed sectional shape. The side bead formed in the vertical wall section of each of the side sills is in the form of a side depressed wall portion of a generally channel sectional shape depressed toward the interior of the side sill, and a lower portion of at least one of the front pillar and the center pillar corresponding to the side sill overlaps the vertical wall section to close the side depressed wall portion, so that the side bead has a closed sectional shape.

With the closed sectional shape, the side sill can have an increased bending strength. As a result, a load produced by a lateral collision and input to at least one of the front and center pillars can be effective dispersed, via the bead, to other members connecting to the other pillars and side sill.

Preferably, the upper wall section of the outer side sill member of each of the side sills is positioned lower than an upper wall section of the inner side sill member, to thereby provide a stepped portion extending upward to a height position of the upper wall section of the inner side sill member. Thus, a welded portion where the center pillar is spot-welded to the upper wall section of the outer side sill member is not located too close to a welded portion where the center pillar is welded to the upper wall section of the inner side sill. Thus, the vehicular side body structure of the invention can achieve an increased strength of fixed joint by spot-welding between the side sill and the center pillar and an increased bending strength against a lateral collision.

According to another aspect of the present invention, there is provided an improved vehicular side body structure, which comprises: left and right side sills disposed on left and right side edge portions of a floor of a passenger compartment of a vehicle, left and right front pillars each extending from a front portion of the left or right side sill to a roof, left and right center pillars each extending from a middle portion of the left or right side sill, each of the left and right side sills having an outer side sill member and an inner side sill member fixedly joined with each other in such a manner that the side sill has a closed sectional shape extending in a front-rear direction of the vehicle, at least one of three sides of the outer side sill member, facing outside of the vehicle, having a channel-shaped bead formed therein and extending from a front end to a rear end of the side sill in parallel to an axis line of the side sill, the bead being in the form of a depressed wall portion of a generally channel sectional shape depressed toward the interior of the side sill or a bulged wall portion of a generally inverted-channel sectional shape protruded away from the interior of the side sill; and a plurality of bulkheads provided within each one of the left and right side sills and spaced from each other in a front-rear direction of the side sill to partition the interior of the side sill, each of the bulkheads having a recessed edge portion or a protruded edge portion, each of the bulkheads being fixedly joined to the outer side sill member with the recessed edge portion on one of edges thereof or the protruded edge portion substantially fittingly engaging with and jointed to a bottom portion of the depressed wall portion or the bulged wall portion of the outer side sill member.

Thus, when an external object collides sideways against (i.e., a lateral collision occurs at) a portion of the side sill between the bulkheads, the side sill would be deformed and the bulkheads would be displaced due to the deformation of the side sill. However, the bulkheads, fixedly joined to the bottom portion of the bead of the channel or inverted-channel sectional shape in fitting engagement with the latter, can be prevented from falling down or collapsing. Further, because the recessed edge portion or protruded edge portion of the outer edge of each of the bulkheads is held in fitting engagement with the bottom portion of the bead formed in the one edge, the bulkhead can be automatically positioned relative to the outer side sill member in the width direction of the vehicle. Thus, positioning of each of the bulkheads can be facilitated.

In a preferred implementation, the three sides of the outer side sill member are an upper wall section, a vertical wall section facing outwardly of the vehicle and a lower wall section, the one edge of each of the bulkheads being an outer vertical edge of the bulkhead, each of the upper wall section, the vertical wall section and the lower wall section having a respective bead in the form of a depressed wall portion of a generally channel sectional shape depressed toward the interior of the side sill. Each of the bulkheads is fixedly joined to the outer side sill member 1) with the recessed edge portion substantially fittingly engaging with and joined to a bottom portion of the depressed wall portion of the vertical wall section and a remaining portion, other than the recessed edge portion, of the vertical edge of the bulkhead fixedly joined to a remaining portion, other than the depressed wall portion, of the vertical wall section, 2) with an upper edge of the bulkhead joined to a bottom portion of the depressed wall portion of the vertical wall section and 3) with a lower edge of the bulkhead joined to a bottom portion of the depressed wall portion of the lower wall section. An upper space is defined between the upper edge of the bulkhead and an outer end portion of the upper wall section located outwardly of the depressed wall portion of the upper wall section, and a lower space is defined between the lower edge of the bulkhead and an outer end portion of the lower wall section located outwardly of the depressed wall portion of the lower wall section. With such upper and lower spaces, the bulkhead can be assembled to the outer side sill member without interfering with the beads of the upper and lower wall sections. As a result, the bulkheads can be positioned with an increased ease.

Preferably, each of the bulkheads has a sectional shape gradually widening in the horizontal, outer-to-inner direction of the passenger compartment, i.e. from the outer end of its portion partitioning the interior of the outer side sill member to the inner end of its another portion partitioning the interior of the inner side sill member. Thus, a load produced due to a lateral collision can be dispersed toward the inner side sill member even more effectively.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIGS. 8A and 8B are views explanatory of the mechanism for increasing the strength of the first embodiment of the vehicular side body structure;

DETAILED DESCRIPTION OF THE PREFERRED EMBODIMENTS

First Embodiment

Figure 1:
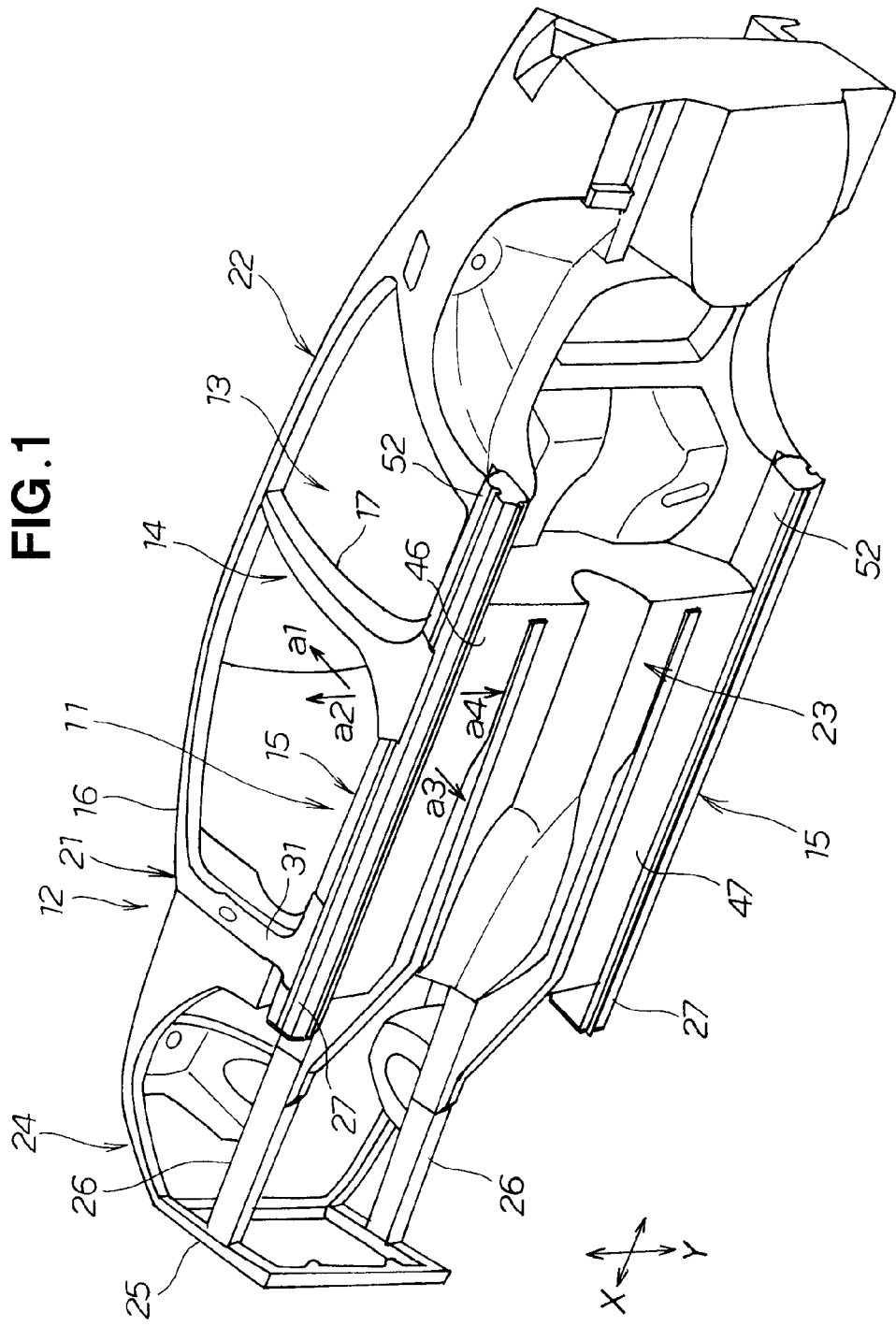
FIG. 1 is a lower perspective view showing a vehicle body employing a first embodiment of a vehicular side body structure of the present invention.

FIG. 1 is a lower perspective view showing a first embodiment of a vehicular side body structure 11 of the present invention. The vehicular side body structure 11, which is incorporated in left and right side bodies 14 defining side walls of a passenger compartment 13 of a vehicle 12, includes left and right side sills 15 constituting a lower section of the side body 14, left and right front pillars (only one of which is shown in the FIG. 16, and left and right center pillars (only one of which is shown in the FIG. 17. The left and right side sills 15 are provided on the left and right side edge portions 46 and 47 of the floor of the passenger compartment 13 and extending in the front-rear direction (i.e., X-axis direction in FIG. 1) of the vehicle 12.

A vehicle body 21 of the vehicle 12 includes the left and right side bodies 14 (having the vehicular side body structure 11 incorporated therein), a roof 22 fixedly joined with upper end portions of the side bodies 14 and extending generally horizontally, an under body 23 continuing from lower end portions of the side bodies 14 to provide a floor of the passenger compartment 13, and a front body 24 connecting to the front of the passenger component 13. The front body 24 includes left and right front side frames 26 extending from the front 25 of the vehicle 12 to the under body 23. Because the vehicular side body structure 11 is constructed symmetrically with respect to the longitudinal centerline of the vehicle 12, the following paragraphs primarily describe one of its two side parts (i.e., left side part) of the body structure 11.

Figure 2:
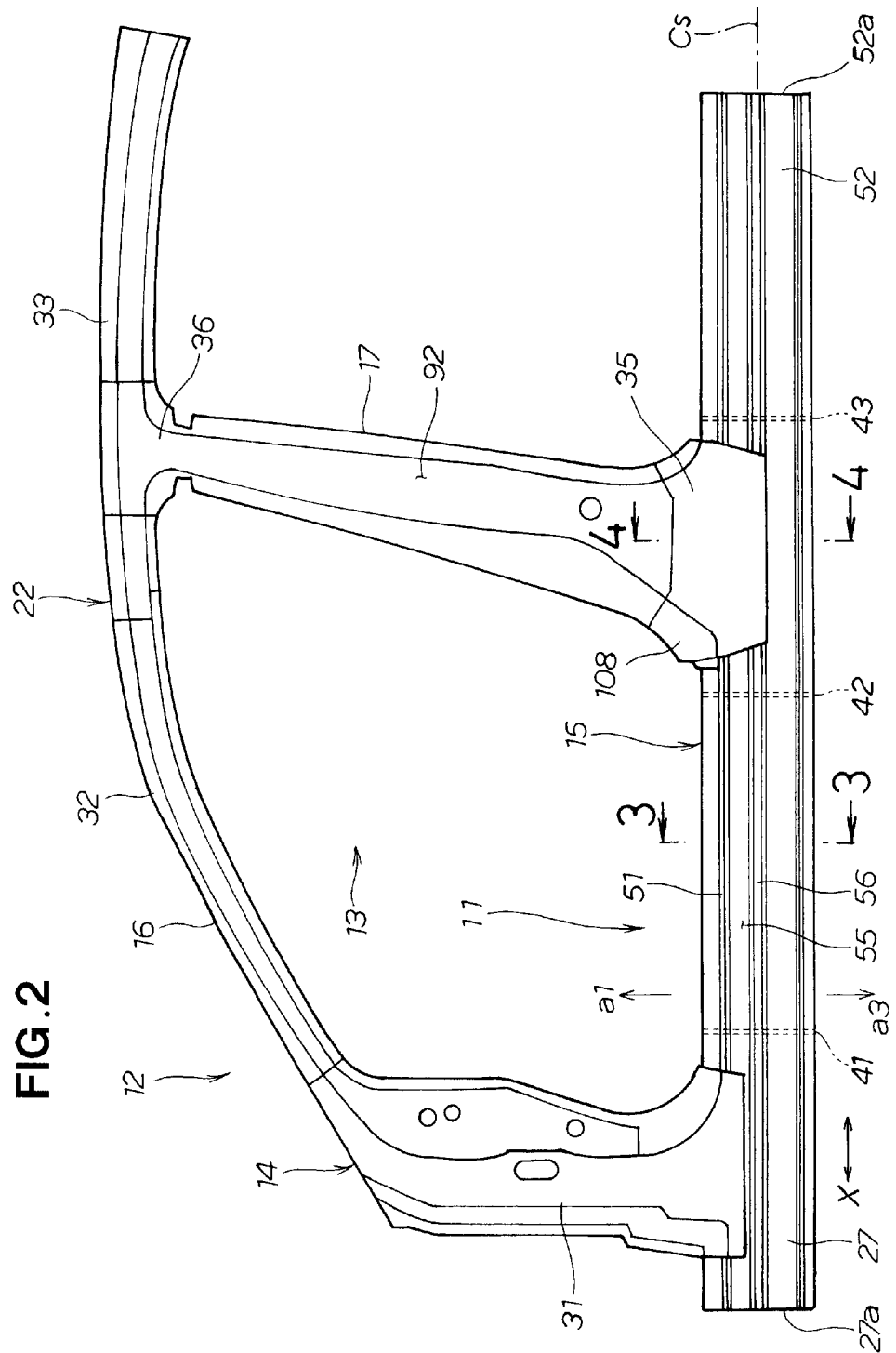
FIG. 2 is a side view of the first embodiment of the vehicular side body structure.

FIG. 2 is a side view of the vehicular side body structure 11 of the present invention. In the vehicular side body structure 11, as shown in FIGS. 1 and 2, a lower portion 31 of the front pillar 16 is fixedly joined to a front portion 27 of the side sill 15, an upper portion 32 of the front pillar 16 is fixedly joined to a roof side rail 33, a lower portion 35 of the center pillar 17 is fixedly joined to a middle portion of the side sill 15, and an upper end portion 36 of the center pillar 17 is fixedly joined to the roof side rail 33. Namely, the front pillar 16 extends from the front portion 27 of the side sill 15 to the roof 22, and the left and right center pillar 17 extends from the middle portion of the side sill 15.

The side sill 15, having a closed sectional shape (e.g., polygonal sectional shape), comprises channel-shaped outer and inner side sill members 63 and 64 fixedly joined with each other.

The inner side sill member 64 includes: first and second welding flange portions 71 and 72 spot-welded (at upper and lower welded portions 68) with first and second welding flange portions 66 and 67 of the outer side sill member 63 in face-to-face overlapping relation to the latter with the inner side sill member 64 in an outwardly-opening orientation and the outer side sill member 63 in an inwardly-opening orientation; an upper wall section 74 integrally continuing substantially horizontally inward of the vehicle 12 (i.e., in a direction of an arrow a4) from the lower end of the welding flange portion 71 and facing upward of the vehicle 12 (i.e., in the direction of the arrow a1); a vertical wall section 75 integrally formed with and continuing downward from the inner end of the upper wall section 74 and facing inward of the vehicle 12 (i.e., in the direction of the arrow a4); and a lower wall section 76 integrally continuing horizontally outward (i.e., in a direction of an arrow a2) from the lower end of the vertical wall section 75 and facing downward of the vehicle 12 (i.e., in a direction of an arrow a3).

The outer side sill member 63 includes: the above-mentioned first and second welding flange portions 66 and 67 spot-welded with the first and third welding flange portions 71 and 72 of the inner side sill member 64 in face-to-face overlapping relation to the latter; an upper wall section 51 integrally continuing substantially horizontally outward (i.e., in the direction of the arrow a2) from the lower end of the first welding flange portion 66 and facing upward (i.e., in the direction of the arrow a1) of the vehicle 12; a vertical wall section 55 integrally continuing downward from the outer end of the upper wall section 51 and facing outward (i.e., in the direction of the arrow a2) of the vehicle 12; and a lower wall section 57 integrally continuing horizontally inward (i.e., in the direction of the arrow a4) from the lower end of the vertical wall section 55, integrally continuing to the second welding flange portion 67 and facing downward of the vehicle 12 (i.e., in the direction of the arrow a3). The outer side sill member 63 also has: an upper bead 54 in the form of a downwardly-depressed, channel-shaped portion formed in the upwardly-facing upper wall section 51; a side bead 56 in the form of an inwardly-depressed, channel-shaped portion formed in the outwardly-facing vertical wall section 55; and a lower bead 61 in the form of an upwardly-depressed, channel-shaped portion formed in the downwardly-facing lower wall section 57. These upper, side and lower beads 54, 56 and 61 each extend from a front end 27a to a rear end 52a of the side sill 15. In other words, all of the upper bead 54, side bead 56 and lower bead 61 are in the form of depressed wall portions (depressions) of a generally channel (U) sectional shape bent or depressed toward the interior of the side sill 15.

A stepped portion 78 is provided by the upper wall section 51 of the outer side sill member 63 being positioned lower than the upper wall section 74 of the inner side sill member 64.

The upper bead 54 extends in the front-rear direction over the same length as the total length of the side sill 15, and it includes opposed side wall portions 81 projecting toward the interior of the side sill 15 (i.e., in a direction of a downward arrow a5) and a bottom portion 82 integral with and located between the lower ends of the side wall portions 81.

Likewise, the side bead 56 extends substantially horizontally in the front-rear direction over the same length as the total length of the side sill 15, and it includes opposed upper and lower wall portions 81 projecting toward the interior of the side sill 15 (i.e., in a direction of a rightward arrow a5) and a bottom portion 82 integral with and located between the inner ends of the side wall portions 81.

Further, the lower bead 61 extends substantially horizontally in the front-rear direction over the same length as the total length of the side sill 15, and it includes opposed side wall portions 81 projecting toward the interior of the side sill 15 (i.e., in a direction of an upward arrow a5) and a bottom portion 82 integral with and located between the upper ends of the side wall portions 81.

In such an outer side sill member 63, the above-mentioned upper wall section 51, vertical wall section 55, lower wall section 57 and the bottom portions 82 each have a flat surface suited for welding.

Figure 3:
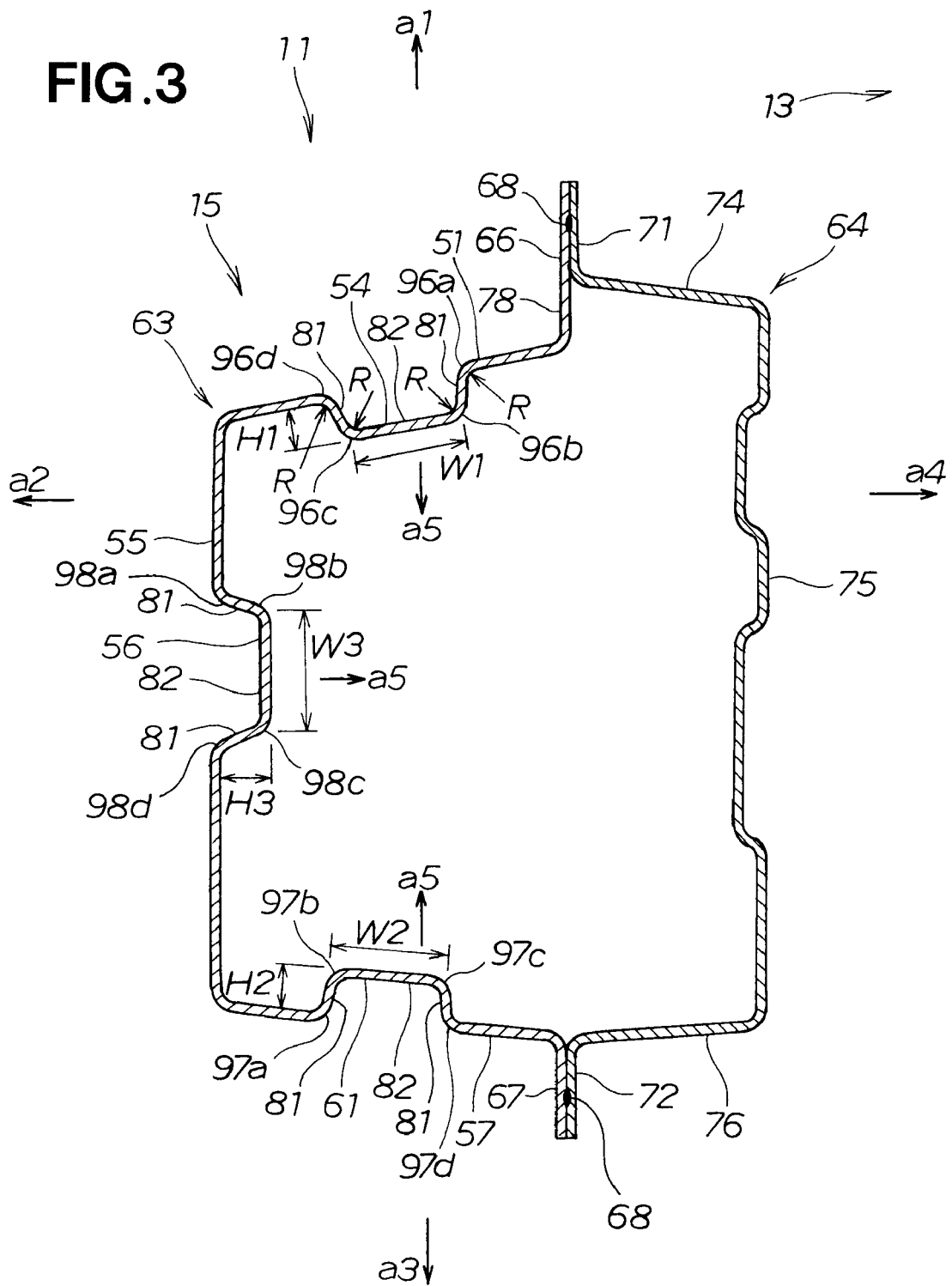
FIG. 3 is a sectional view taken along line 3-3 of FIG. 2.
Figure 4:
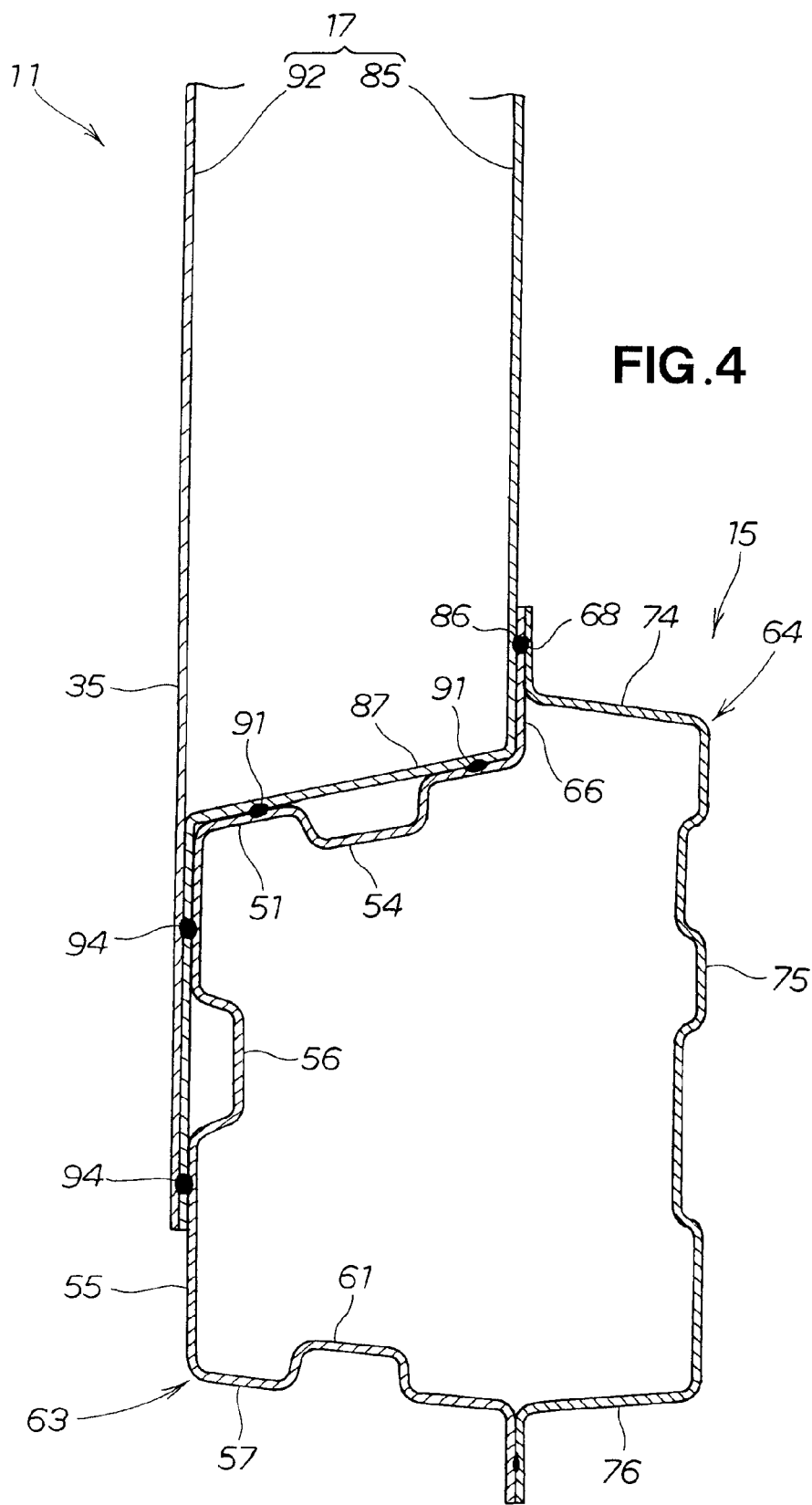
FIG. 4 is a sectional view taken along line 4-4 of FIG. 2.

As set forth above and as seen from FIGS. 2-4, the side sill 15 is constructed by fixedly joining the outwardly-opening, channel-shaped inner side sill member 64 to the inwardly-opening, channel-shaped outer side sill member 63 with the stepped portion 78 formed by the upper wall section 51 of the outer side sill member 63 being positioned lower than the upper wall section 74 of the inner side sill member 64.

The downwardly-depressed, channel-shaped upper bead 54 and inwardly-depressed, channel-shaped side bead 56 of the outer side sill member 63 are each formed in a closed sectional shape by being closed with the lower portion 35 of the center pillar 17 or the lower portion 31 of the front pillar 16.

The lower portion 35 of the center pillar 17 is fixedly joined to the side sill 15 as follows. Namely, a lower end portion of an inner wall section 85 of the center pillar 17 is positioned in overlapping contact with the outer surface of the first welding flange portion 66 and then spot-welded to the latter at an upper spot-welded portion 86, and a support wall section 87 of the center pillar 17 is positioned in overlapping contact with the upper wall section 51 and then spot-welded to the latter at side welded portions 91; in this way, the upper bead 54 is closed with the lower portion 35 of the center pillar 17 to have a closed sectional shape. Further, an outer wall section 92 of the center pillar 17 is positioned in overlapping contact with the vertical wall section 55 and then spot-welded to the latter at side welded portions 94, so that the side bead 56 is closed with the outer wall section 92 of the center pillar 17 to have a closed sectional shape.

The lower portion 31 of the front pillar 16 is fixedly joined to the side sill 15 in a similar manner to the lower portion 35 of the center pillar 17; in this way, the upper bead 54 is closed with the lower portion 31 of the front pillar 16 to have a closed sectional shape.

FIG. 3 is a sectional view taken along the 3-3 line of FIG. 2, and FIG. 4 is a sectional view taken along the 4-4 line of FIG. 2. The following describe in more detail the vehicular side body structure 11 with reference to FIGS. 1-4. Note that, in FIGS. 3-6, illustration of bulkheads (to be described later) is omitted for clarity.

The side sill 15 comprises the outer side sill member 63 and the inner side sill member 64 that together define the closed sectional shape extending in the front-rear direction (X-axis direction) of the vehicle 12. In the outer side sill member 63, the upper wall section 51 gradually slants upward in a horizontal, outer-to-inner direction of the vehicle compartment 13 (i.e., in a direction from outside the passenger compartment 13 toward the interior of the passenger compartment 13), and the lower wall section 57 gradually slants downward in the horizontal, outer-to-inner direction of the vehicle compartment 13. Further, the upper wall section 51 has the downwardly-depressed, channel-shaped upper bead 54, the lower wall section 57 has the upwardly-depressed, channel-shaped lower bead 61, and such beads 54 and 61 extend from the front end 27a to the rear end 52a of the side sill 15. Note that such a bead need be formed in at least one of the upper and lower wall sections 51 and 57. The bottom portion 82 of the downwardly-depressed, channel-shaped upper bead 54 has a width W1 (which is a dimension between the outer end and the inner end of the bead bottom portion 82) greater than a depth or vertical dimension (i.e., dimension in a direction orthogonal to the bottom surface of the bead bottom portion 82) H1 of the upper bead 54. Similarly, the bottom portion 82 of the upwardly-depressed, channel-shaped lower bead 61 has a width W2 (i.e., dimension between the outer end and the inner end of the bead bottom portion 82) greater than a depth or vertical dimension (i.e., dimension in a direction orthogonal to the bottom surface of the bead bottom portion 82) H2 of the bead 61.

Further, in the outer side sill member 63, the vertical wall section 55 integrally formed with the upper and lower wall sections 51 and 57 and facing outwardly of the vehicle 12 (i.e., in the direction of the arrow a2) has the inwardly-depressed, channel-shaped side bead 56 extending from the front end 27a to the rear end 52a of the side sill 15. With the above-mentioned beads 54, 61 and 56, the side sill 15 has a multi-polygonal closed sectional shape. The bottom portion 82 of the inwardly-depressed, channel-shaped side bead 56 has a width W3 (i.e., dimension between the upper end and the lower end of the bead bottom portion 82) greater than a depth or horizontal dimension (i.e., dimension in a direction orthogonal to the bottom surface of the bead bottom portion 82) H3 of the side bead 56.

The downwardly-depressed, channel-shaped upper bead 54 has at least four edge lines 96a, 96b, 96c and 96d. Each of the edge lines 96a, 96b, 96c and 96d is a portion bent at a minimum possible curvature determined in accordance with a strength and thickness of a thin steel plate (i.e., pressing material) 101 of which the outer side sill member 63 is formed. Each of the edge lines 96a, 96b, 96c and 96d has the same length as the side sill 15 extending from the front end 27a to the rear end 52a.

The upwardly-depressed, channel-shaped lower bead 61 has at least four edge lines 97a, 97b, 97c and 97d. The edge lines 97a, 97b, 97c and 97d of the upwardly-depressed, channel-shaped lower bead 61 are constructed in a similar manner to the edge lines 96a, 96b, 96c and 96d of the downwardly-depressed, channel-shaped upper bead 54.

The inwardly-depressed, channel-shaped side bead 56 has at least four edge lines 98a, 98b, 98c and 98d. The edge lines 98a, 98b, 98c and 98d of the inwardly-depressed, channel-shaped side bead 56 are constructed in a similar manner to the edge lines 96a, 96b, 96c and 96d of the downwardly-depressed, channel-shaped upper bead 54.

Figure 5:
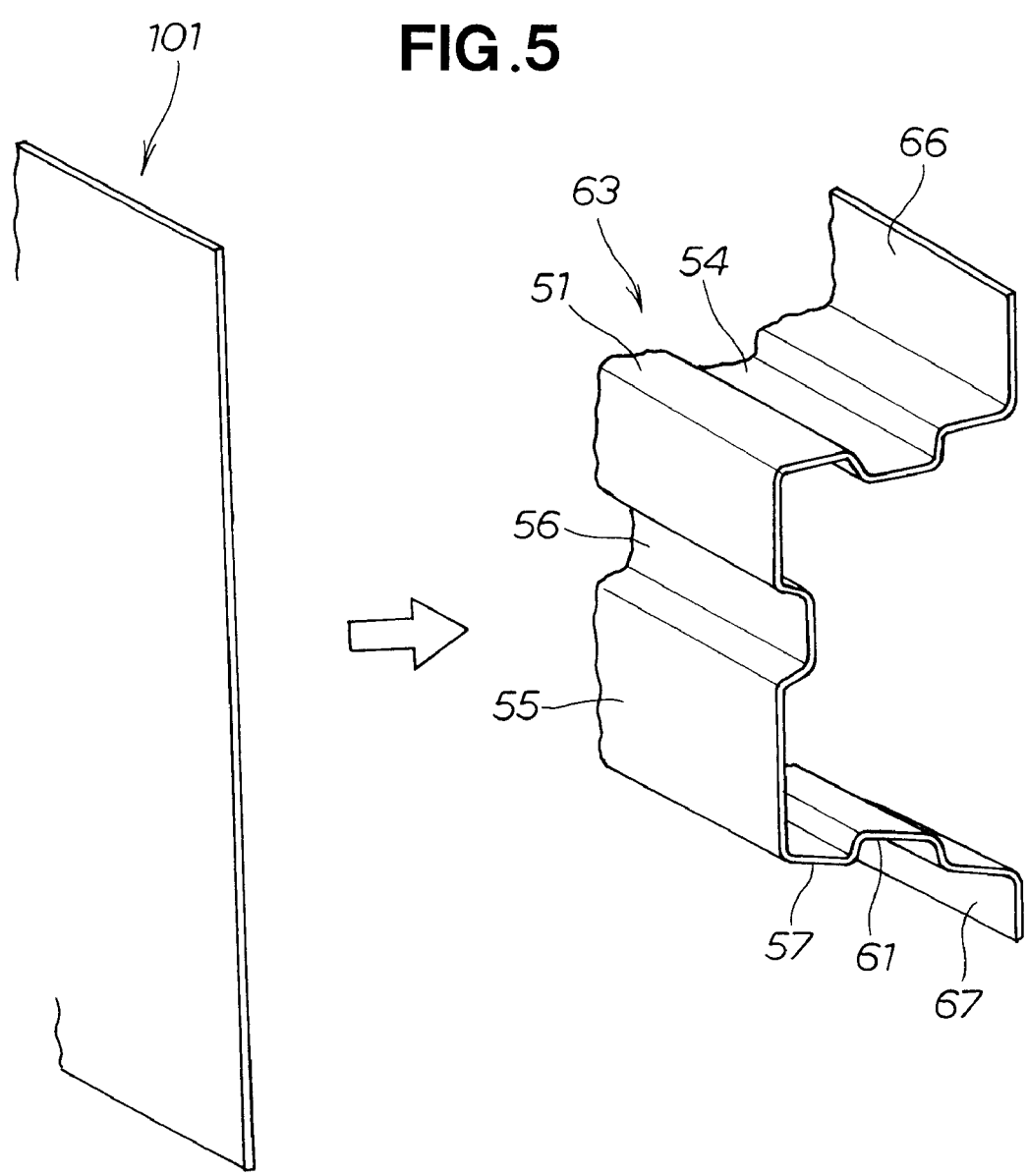
FIG. 5 is a perspective view explanatory of how an outer side sin member of the vehicular side body structure is manufactured.

The thin steel plate of which the outer side sill member 63 is formed is a high-tension (or high-strength) steel plate (e.g., type No. "SPFH(JIS G 3134)"). By using the high-tension steel plate and forming each of the edge lines 96a, 96b, 96c, 96d, 97a, 97b, 97c, 97d, 98a, 98b, 98c and 98d at a minimum possible curvature determined in accordance with the strength and wall thickness of the thin steel plate as noted above, the outer side sill member 63 can have a reduced thickness and an increased strength. The outer side sill member 63 is formed into a polygonal sectional shape as shown in FIG. 5 by roll forming or bend forming.

Note that, whereas the outer side sill member 63 has been described as having one downwardly-depressed, channel-shaped upper bead 54 formed in the upper wall section 51, two such downwardly-depressed, channel-shaped upper beads 54 may be formed in the upper wall section 51; in such a case, the respective widths W1 of the two upper beads 54 may be set as necessary.

Further, whereas the outer side sill member 63 has been described as having one upwardly-depressed, channel-shaped lower bead 61 formed in the lower wall section 57, two such upwardly-depressed, channel-shaped lower beads 61 may be formed in the lower wall section 57; in such a case, the respective widths W1 of the two lower beads 61 may be set as necessary.

Furthermore, whereas the outer side sill member 63 has been described as having one inwardly-depressed, channel-shaped side bead 56 formed in the vertical wall section 55, two or more such inwardly-depressed, channel-shaped side beads 56 may be formed in the vertical wall section 55. Because the vertical wall section 55 has a relatively great dimension in a vertical direction (i.e., in the direction of the arrows a1 and a3), two inwardly-depressed, channel-shaped side beads 56 each having the width W3 may be formed in the vertical wall section 55.

The outer side sill member 63 of the vehicular side body structure 11 is manufactured in a manner as shown in FIG. 5. First, a desired pressing material 101 is cut out from a roll of thin steel plate. Next, the cut-out pressing material 101 is subjected to roll forming for forming the upper wall section 51, vertical wall section 55 and lower wall section 57 and then forming the upper bead 54, side bead 56 and lower bead 57 are formed in the upper wall section 51, vertical wall section 55 and lower wall section 57, respectively. In this way, manufacturing of the outer side sill member 63 is completed. Note that the upper wall section 51, vertical wall section 55 and lower wall section 57 and the upper bead 54, side bead 56 and lower bead 57 may be formed by bend forming using a press brake rather than by the roll forming.

Figure 6:
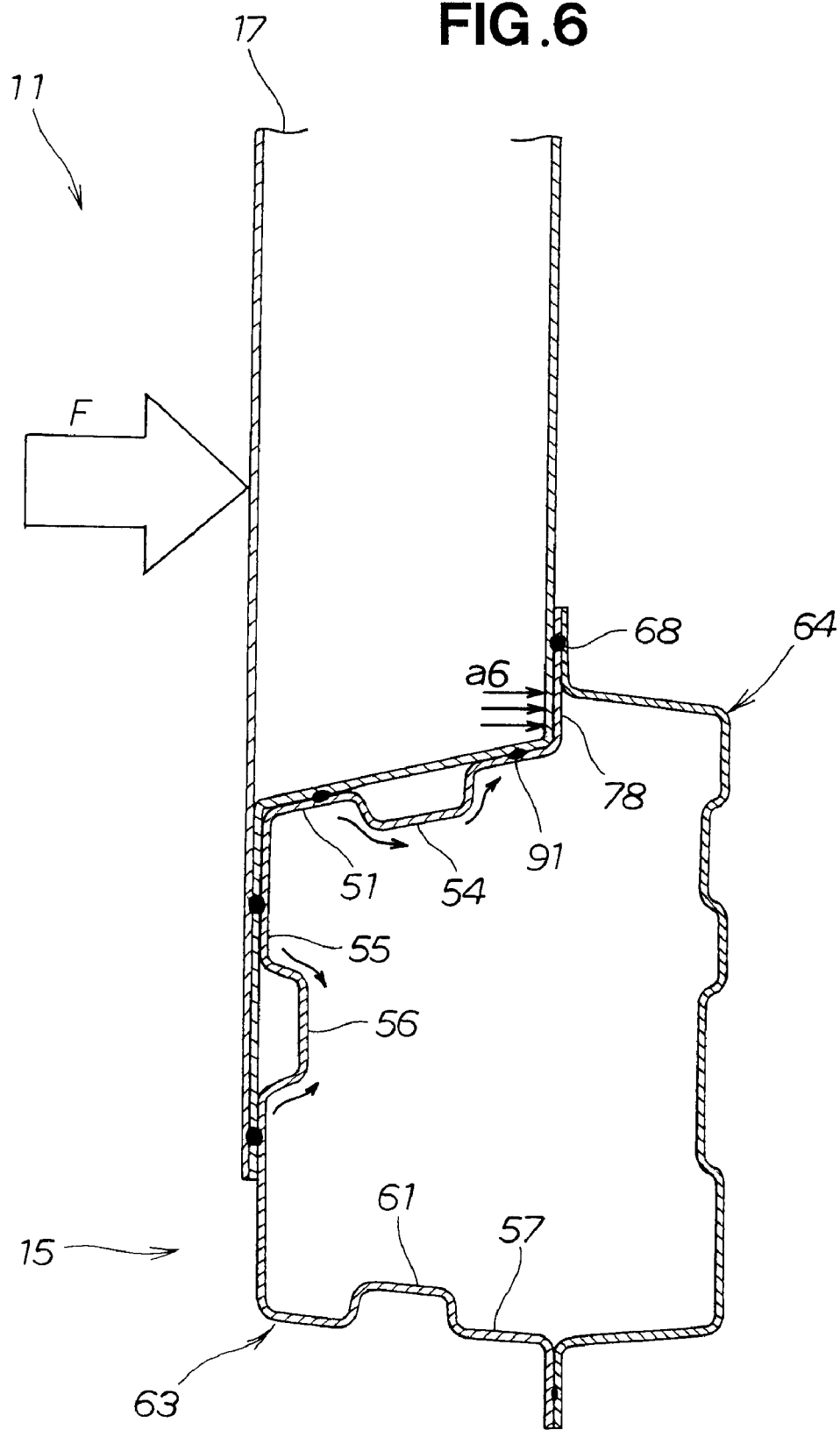
FIG. 6 is a sectional view explanatory of a mechanism for increasing a strength of the first embodiment of the vehicular side body structure.

The following describe behavior of the first embodiment of the vehicular side body structure 11, with reference to FIGS. 2 and 6.

The vehicular side body structure 11 can achieve an increased axial compressive strength and an increased bending strength of the side sill 15 against a load applied to the front surface of the vehicle in the case of a frontal collision (including an offset collision). Namely, with the upper bead 54, side bead 56 and lower bead 57 formed in the upper wall section 51, vertical wall section 55 and lower wall section 57, respectively, the vehicular side body structure 11 can reduce a stress produced in the side sill 15 responsive to a load applied to the side sill 15 in an axial direction of the side sill 15 (i.e., X-axis direction of FIG. 2), to thereby increase the compressive strength of the side sill 15. The vehicular side body structure 11 with the upper bead 54, side bead 56 and lower bead 57 can increase the compressive strength of the side sill 15 by about 2.3 times as compared to the conventionally-known vehicular side body structure having no such upper bead, side bead and lower bead.

Further, with the upper bead 54, side bead 56 and lower bead 57, the vehicular side body structure 11 can reduce a stress produced in the side sill 15 responsive to a load F applied to the side sill 15 in a direction orthogonal to an axis line Cs of the side sill 15, i.e. applied due to a lateral collision, to thereby increase the bending strength of the side sill 15. The vehicular side body structure 11 with the upper bead 54, side bead 56 and lower bead 57 can increase the bending strength of the side sill 15 by about 2.5 times as compared to the conventionally-known vehicular side body structure having no such upper bead, side bead and lower bead.

Furthermore, with the vehicular side body structure 11, a load applied to the front surface of the vehicle 12 (due to a frontal collision) or a load applied to a side surface of the vehicle 12 (due to a lateral collision) can be effectively dispersed through the closed sectional shapes defined by the upper and side beads 54 and 56 and the lower portion of the center pillar 17 closing the beads 54 and 56. Thus, the vehicular side body structure 11 can even further increase the compressive strength and bending strength of the side sill 15.

Furthermore, in the vehicular side body structure 11, where the stepped portion 78 is formed by the upper wall section 51 of the outer side sill member 63 being positioned lower than the upper wall section 74 of the inner side sill member 64 and the stepped portion 78 extends upward to a height position of the upper wall section 74 of the inner side sill member 64, spot-welded portions 91 between the upper wall section 51 and the center pillar 17 are not located too close to, i.e. located some distance from, the upper spot welded portion 68 between the flanges 66 and 71 of the outer and inner side sill members 63 and 64. Because the spot-welded portions 91 and the upper spot welded portion 68 are not located too close to each other, the side sill 15 and the center pillar 17 can be fixedly joined with each other with an increased joining strength, so that the vehicular side body structure 11 can achieve an increased strength against a lateral collision.

Furthermore, the vehicular side body structure 11, where a load produced due to a lateral collision is applied to the side sill 14 via the center pillar 17, abutting against the stepped portion 78, as indicated by arrows a6, can prevent the center pillar 17 from being deformed toward the interior of the passenger compartment 13.

Furthermore, with the vehicular side body structure 11, where the individual beads 54, 56 and 61 of the outer side sill member 63 are formed by roll forming or bend forming, the beads can be formed with ease.

Furthermore, whereas the outer side sill member 63 has been described as having one inwardly-depressed, channel-shaped lower bead 56 formed in the vertical wall section 55, two or more such inwardly-depressed, channel-shaped side beads 56 may be formed in the vertical wall section 55. Particularly, because the vertical wall section 55 has a relatively great dimension in a vertical direction (i.e., in the direction of the arrows a1 and a3), two inwardly-depressed, channel-shaped side beads 56 each having the width W3 may be formed in the vertical wall section 55.

Figure 7:
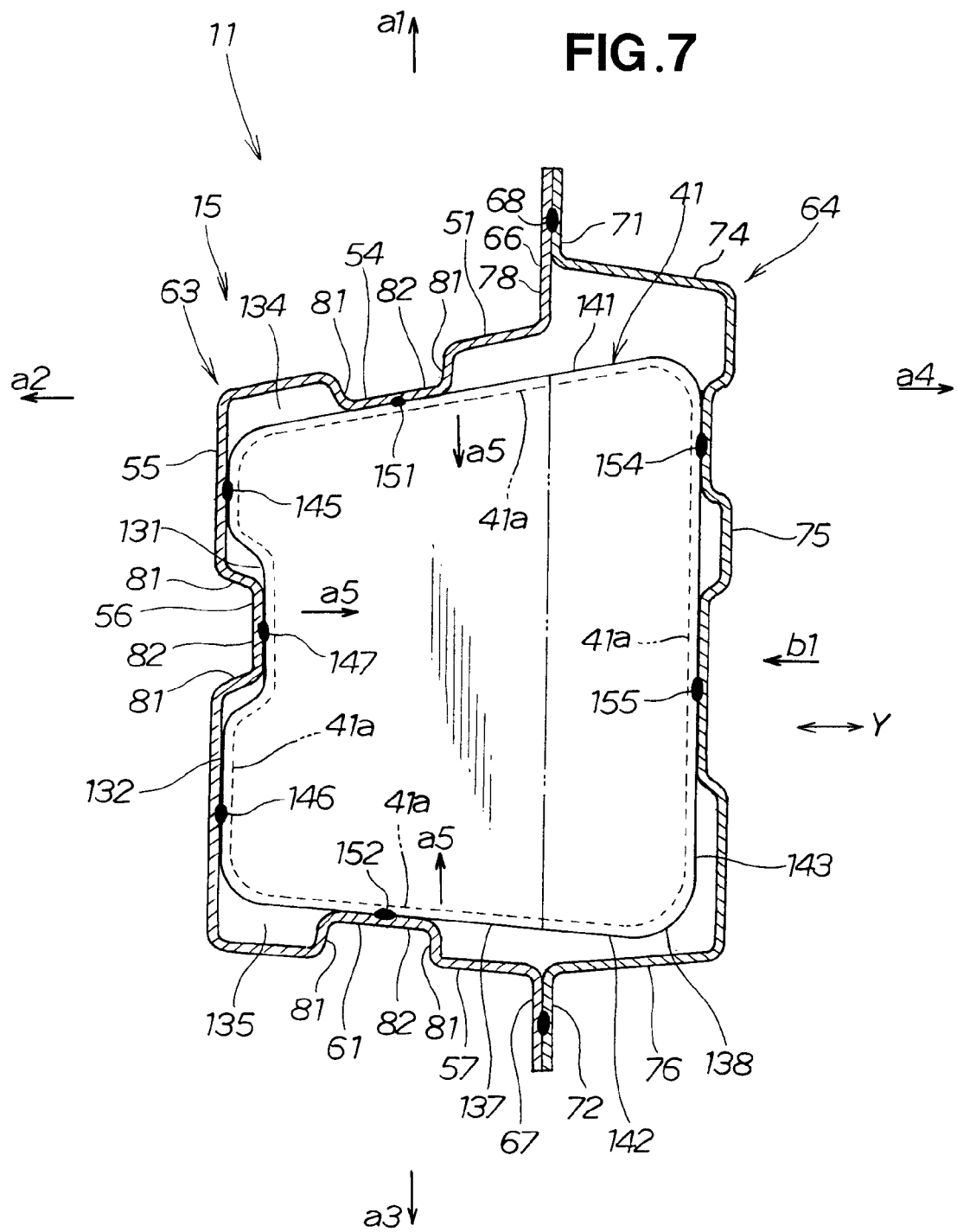
FIG. 7 is a sectional view taken along line 3-3 of FIG. 2, which particularly shows relationship between a side sill and a bulkhead in the first embodiment.

The vehicular side body structure 11 further includes the first bulkhead 41 provided within the front portion 27 of the side sill 15 and the second and third bulkheads 42 and 43 provided within the middle portion of the side sill 15, as shown in FIG. 7. Although the following paragraphs primarily describe the first bulkhead 41, the second and third bulkheads 42 and 43 are constructed generally similarly to the first bulkhead 41.

FIG. 7 is a sectional view corresponding to FIG. 3 taken along the 3-3 line of FIG. 2. In the side sill 15, as set forth above, the outer side sill member 63 has three sides, i.e. the aforementioned upper wall section 51, vertical wall section 55 and lower wall section 57, and at least one of the three sides (upper wall section 51, vertical wall section 55 and lower wall section 57), e.g., the vertical wall section 55 has the channel-shaped side bead 56 of a channel sectional shape (more specifically, laterally-facing U sectional shape) extending in parallel to the axis line Cs of the side sill 15. Further, the first, second and third bulkheads 41, 42 and 43, which partition the interior of the side sill 15 by extending vertically within the side sill 15 and being spaced part from one another in a direction from the front portion 27 to a rear portion 52 of the side sill 15, are each fixedly joined to the side sill 15 with a flat bottom surface of its inwardly recessed outer edge portion 131, formed in an outer vertical edge 132 of the bulkhead, substantially fitted over (fittingly engaging with) the bottom portion 82 of the side bead 56 and fixedly joined to the bottom portion 82 of the side bead 56 projecting inwardly of the side sill 15 (i.e., in the direction of the rightward arrow a5).

The first bulkhead 41 has been described and shown as having the inwardly recessed outer edge portion 131 substantially fitted over (fittingly engaging with) the bottom portion 82 of the inwardly depressed side bead 56 in the form of an inward depression of a laterally U sectional shape and fixedly joined to the bottom portion 82 of the side bead 56 of the side sill 15. In an alternative, however, the side bead 56 may be in the form of an outwardly bulged wall portion (outward bulge) of a generally inverted-channel sectional shape protruded away from the interior of the side sill 15, and the first bulkhead 41 may have an outwardly projecting edge portion of a substantially trapezoidal sectional shape substantially fitted in (fittingly engaging with) the bottom portion (in this case, this may be called a ceiling portion) 82 of the side bead 56 and fixedly joined to the bottom portion of the side bead 56, although not particularly shown.

More specifically, the outer side sill member 63 has the three sides, i.e. the upwardly-facing upper wall section 51, outwardly-facing vertical wall section 55 and downwardly-facing lower wall section 57, which have the upper bead 54, side bead 56 and lower bead 61, respectively. Each of the beads 54, 56 and 61 has the bottom portion 82. In the first bulkhead 41, the inwardly recessed outer edge portion 131 of the outer vertical edge 132 is substantially fitted over (fittingly engaging with) the bottom portion of the side bead 56 and fixedly joined to the bottom portion 82 of the side bead 56, a flat portion (other than the inwardly recessed outer edge portion 131) of the outer vertical edge 132 is fixedly joined to a vertical flat wall portion (other than the side bead 56) of the vertical wall section 55, substantially middle portions of upper and lower horizontal edges 141 and 142 are fixedly joined to the bottom portions 82 of the upper and lower beads 54 and 61 of the upper and lower wall sections 51 and 57 of the side sill 15, an upper space 134 is defined between an outer portion of the upper horizontal edge 141 and a flat, outer portion of the upper wall section 51, a lower space 135 is formed between an outer portion of the lower horizontal edge 142 and a flat, outer portion of the lower wall section 57.

Each of the first to third bulkheads 41 to 43 (only the first bulkhead 41 is shown in FIG. 7) widens in the horizontal, outer-to-inner direction, i.e. from the outer end of its portion 137 partitioning the interior of the outer side sill member 63 to the inner end of its another portion partitioning the interior of the inner side sill member 64; that is, each of the first to third bulkheads 41 to 43 has a sectional shape gradually widening in the horizontal, outer-to-inner direction of the vehicle compartment 13.

More specifically, each of the first to third bulkheads 41 to 43 (only the first bulkhead 41 will be described with reference to FIG. 7) is provided by forming a plate-shaped material into a substantially trapezoidal shape and has the above-mentioned outer vertical edge 132, the upper horizontal edge 141 gradually slanting upward in the horizontal, outer-to-inner direction of the vehicle compartment 13, the lower horizontal edge 142 gradually slanting downward in the horizontal, outer-to-inner direction of the passenger compartment 13, and an inner vertical edge 143. The outer vertical edge 132 of the bulkhead is fixedly joined to the vertical wall section 55 of the outer side sill member 63, and the outer vertical edge 132 has the inwardly recessed outer edge portion 131 formed in a vertically middle region thereof and fixedly joined to the bottom portion 82 of the side bead 56 of the vertical wall section 55. Further, the upper horizontal edge 141 is fixedly joined to the bottom portion 82 of the upper wall section 51, the lower horizontal edge 142 is fixedly joined to the bottom portion 82 of the lower wall section 57, and the inner vertical edge 143 is fixedly joined to the vertical wall section 75 of the inner side sill member 64. For the above-mentioned fixed joint between the bulkhead 41 and the side sill 15, the bulkhead 41 has a spot-welding peripheral flange 41a formed integrally with the outer vertical edge 132, upper horizontal edge 141, lower horizontal edge 142 and inner vertical edge 143, and it is spot-welded to an interior surface of the side sill 15 at a plurality of points of the flange 41a. The second and third bulkheads 42 and 43 are constructed similarly to the first bulkhead 41.

The following describe how the first to third bulkheads 41 to 43 employed in the vehicular side body structure 11 are assembled to the side sill 15, with reference to FIG. 7.

First, the first to third bulkheads 41 to 43 are fixedly joined to the outer side sill member 63. Namely, before the inner side sill member 64 is fixedly joined to the outer side sill member 63, the first to third bulkheads 41 to 43 are inserted into the outer side sill member 63 as indicated by a leftward arrow b1, at which time the outer vertical edge 132 of each of the bulkheads 41 to 43 is abutted against the vertical wall section 55 of the outer side sill member 63 and then the inwardly recessed outer edge portion 131 is abutted against the bottom portion of the inwardly-depressed side bead 56 of the outer side sill member 63 so that the bulkhead can be automatically positioned appropriately in a width direction (i.e., Y-axis direction) of the vehicle 12. Then, the peripheral flange 41a of the first bulkhead held in overlapping contact with a surface, facing the interior of the side sill 15, of the outer side sill member 63 is spot-welded to the latter at first to fifth welded portions 145-147, 151 and 152. The second bulkhead 42 and third bulkhead 43 are spot-welded to the outer side sill member 63 in a similar manner to the first bulkhead 41.

After that, the inner side sill member 64 is fixedly joined to the outer side sill member 63. Namely, the first and second welding flange portions 71 and 72 of the inner side sill member 64 are brought to overlapping contact with the first and second welding flange portions 66 and 67 of the outer side sill member 63 and fixedly joined to the latter by spot welding as set forth above.

Finally, the first to third bulkheads 41 to 43 are fixedly joined, at welded portions 154 and 155, to the inner side sill member 64 by arc welding. For this purpose, through-holes (not shown) are formed in advance in the inner side sill member 64, and the edges of the through-holes are subjected to fillet welding, or the through-holes are subjected to plug welding. In an alternative, the first to third bulkheads 41 to 43 may be fixedly joined to the inner side sill member 64 by structural adhesive.

The following further describe behavior of the first embodiment of the vehicular side body structure 11 having the bulkheads 41-43, with combined reference to FIGS. 8A and 8B and FIGS. 2 and 3. FIGS. 8A and 8B are views explanatory of the strength enhancing mechanism of the vehicular side body structure 11.

In the vehicular side body structure 11, the first to third bulkheads 41 to 43, each fixed in an upright orientation within the side sill 15, can be reliably prevented from easily falling down or collapsing due to a lateral collision. More specifically, once an external object collides sideways against (i.e., a lateral collision occurs at) a portion of the side sill 15 between the first and second bulkheads 41 and 42 as indicated by an arrow a8 in FIG. 8A, the side sill 15 would be bent as shown in FIG. 8B. As the first and second bulkheads 41 and 42 would be displaced (in a direction of an arrow b2 or b3 in FIG. 2 or FIG. 8B) due to the bending of the side sill 15, the inwardly recessed outer edge portions 131 of the first and second bulkheads 41, held in abutment against the side bead 56 of the vertical wall section 55, can be prevented from falling down or collapsing although they may incline a little. As a consequence, the vehicular side body structure 11 can achieve an enhanced anti-lateral-collision performance and an increased strength and rigidity of the vehicle body.

The vehicular side body structure 11 behaves in a similar manner to the aforementioned even when a lateral collision has occurred at a different position from the aforementioned. If a lateral collision has occurred near the second bulkhead 42, for example, the vehicular side body structure 11 can reliably prevent the first bulkhead 41 from falling down and thereby can achieve an enhanced anti-lateral-collision performance and an increased strength and rigidity of the vehicle body.

Whereas the first embodiment of the vehicular side body structure 11 has been described as having the inwardly recessed outer edge portion 131 only in the outer vertical edge 132 of each of the first to third bulkheads 41 to 43, the upper horizontal edge 141 and the lower horizontal edge 142 may have such a recessed edge portion 131 for substantial engagement with the upper bead 54 and the lower bead 61. In such a case, the bulkheads 41 to 43 are assembled to the outer side sill member 63 by each of the bulkheads 41 to 43 being inserted into the outer side sill member 63 through the front end 27a or rear end 52a of the outer side sill member 63. Such a modification can more reliably prevent the bulkheads 41 to 43 from falling down in a direction of an arrow b5 or b6 by the recessed edge portion 131 of the upper horizontal edge 141 abutting against the upper bead 54 and by the recessed edge portion 131 of the lower horizontal edge 142 abutting against the lower bead 61. As a result, the modification can achieve an even further enhanced anti-lateral-collision performance and an even further increased strength and rigidity of the vehicle body.

Further, in assembling the bulkheads 41 to 43 to the outer side sill member 63, the first embodiment of the vehicular side body structure 11 can automatically appropriately position each of the bulkheads 41 to 43 in the vehicle width direction by abutting the outer vertical edge 132 against the vertical wall section 55 of the outer side sill member 63 in such a manner that the inwardly recessed outer edge portion 131 is snugly abutted against the side bead 56. Thus, each of the first to third bulkheads 41 to 43 can be automatically positioned in the vehicle width direction with an extremely enhanced accuracy.

Furthermore, with the space 134 defined between the flat, outer portion of the upper wall section 51 of the outer side sill member 63 and the outer portion of the upper horizontal edge 141 spaced downwardly from the outer portion of the upper wall section 51 and with the space 135 defined between the outer portion of the lower wall section 57 of the outer side sill member 63 and the outer portion of the lower horizontal edge 142 spaced upwardly from the outer portion of the lower wall section 57, the first embodiment of the vehicular side body structure 11 allows the first to third bulkheads 41 to 43 to be fittingly assembled to the outer side sill member 63 from an interior side of the vehicle 12, as indicated by the arrow 131, without interfering with the upper and lower beads 54 and 61. As a result, the first to third bulkheads 41 to 43 can be positioned with an increased ease.

Furthermore, with each of the first to third bulkheads 41 to 43 having a sectional shape widening in the horizontal, outer-to-inner direction of the passenger compartment 13 with the inner vertical edge 143 having a greater vertical dimension than the outer vertical edge 132, the first embodiment of the vehicular side body structure 11 can effectively disperse an inward external force, applied via the outer vertical edge 132, over a wider area than in a case where the inner vertical edge 143 is formed to the same vertical dimension as the outer vertical edge 132. If the entire vertical length of the inner vertical edge 143 is held in contact with the vertical wall section 75 of the inner side sill member 64, the inward external force can be dispersed over a much wider range.

Second Embodiment

Figure 9:
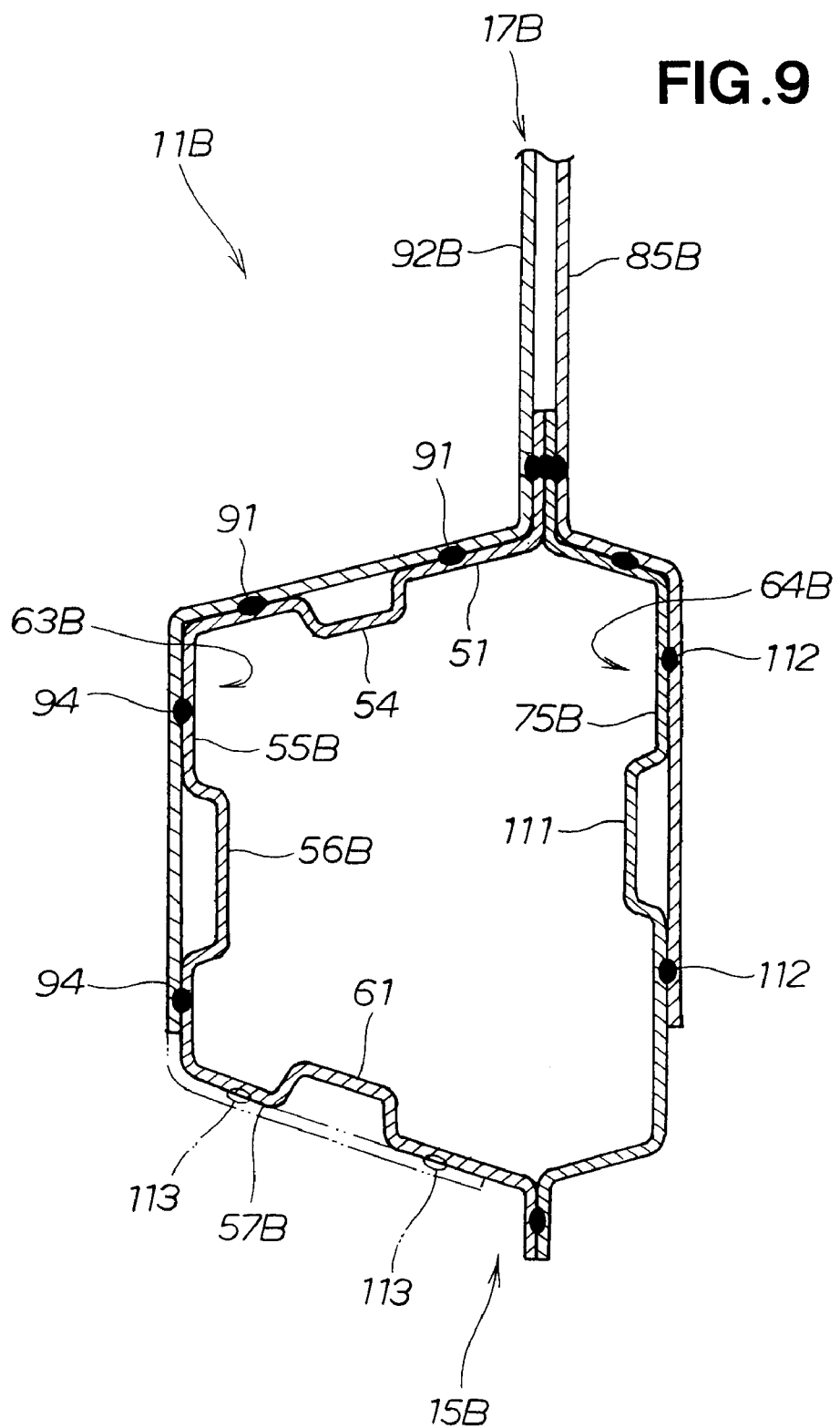
FIG. 9 is a sectional view showing a second embodiment of the vehicular side body structure of the present invention.

Next, a description will be given about a second embodiment of the vehicular side body structure 11B of the present invention, with reference to FIG. 9. Similar elements to those in FIGS. 1-6 are indicated by the same reference numerals as used in FIGS. 1-6 and will not be described here to avoid unnecessary duplication. FIG. 9 is a sectional view corresponding to FIG. 4 taken a little anterior to the 4-4 line of FIG. 2, i.e. vertically through a front edge portion 108 (FIG. 2) of the center pillar 17. Note that, in FIG. 9, illustration of the bulkhead is omitted for clarity.

The second embodiment of the vehicular side body structure 11B is characterized by a manner in which the center pillar 17B is fixedly joined to the side sill 15B. Namely, an outwardly-depressed, channel-shaped side bead 111 is formed in the vertical wall section 75B of the inner side sill member 64B, and the inner wall section 85B of the center pillar 17B is positioned to overlap the vertical wall section 75B and spot-welded, at a spot-welded portion 112, to the vertical wall section 75B. In this manner, the outwardly-depressed, channel-shaped side bead 111 is closed with the inner wall section 85B so that the side bead 111 has a closed sectional shape. As a result, the second embodiment of the vehicular side body structure 11B can achieve an even further increased strength against a front collision and lateral collision.

Further, in the second embodiment of the vehicular side body structure 11B, the outer wall section 92B of the center pillar 17B may be positioned to overlap the lower wall section 57B of the outer side sill member 63B and spot-welded, at a spot-welded portion 113, to the lower wall section 57B as indicated by two-dot-dash line so that the upwardly-depressed, channel-shaped lower bead 61 is closed with the outer wall section 92B and thereby has a closed sectional shape. As a result, the second embodiment of the vehicular side body structure 11B can achieve an even further increased strength against a front collision and lateral collision.

Third Embodiment

Figure 10:
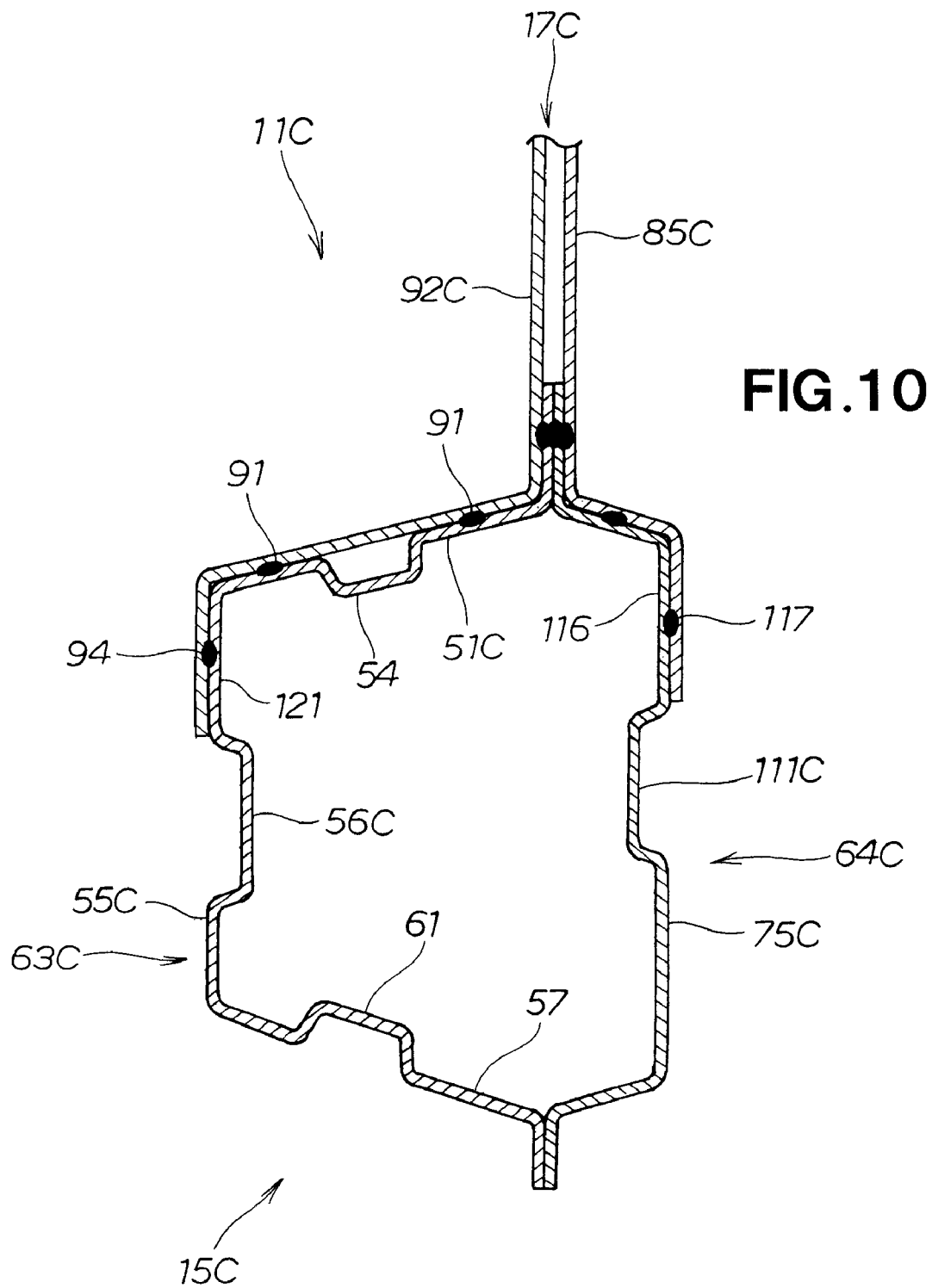
FIG. 10 is a sectional view showing a third embodiment of the vehicular side body structure of the present invention.

Next, a description will be given about a third embodiment of the vehicular side body structure 11C of the present invention, with reference to FIG. 10. FIG. 10 is a sectional view, corresponding to FIG. 4, taken a little anterior to the 4-4 line of FIG. 2, i.e. vertically through the front edge portion 108 (FIG. 2) of the center pillar 17. Similar elements to those in FIGS. 1-6 are indicated by the same reference numerals as used in FIGS. 1-6 and will not be described here to avoid unnecessary duplication. Note that, in FIG. 10, illustration of the bulkhead is omitted for clarity.

The third embodiment of the vehicular side body structure 11C is characterized by a manner in which the center pillar 17C is fixedly joined to the side sill 15C. Namely, an outwardly-depressed, channel-shaped side bead 111C is formed in the vertical wall section 75C of the inner side sill member 64C, and the inner wall section 85C of the center pillar 17C is positioned to overlap the vertical wall section 75C and spot-welded, at a spot-welded portion 117, to a portion 116 of the vertical wall section 75C immediately above the side bead 111C. Further, the outer wall section 92C of the center pillar 17C is positioned to overlap the upper wall section 51C of the outer side sill member 63C and spot-welded, at spot-welded portions 91, to the upper wall section 51C of the outer side sill member 63C so that the upper bead 54 is closed with the outer wall section 92C to have a closed sectional shape. Further, the outer wall section 92C of the center pillar 17C is positioned to overlap the spot-welded, at a spot-welded portion 94, to a portion 121 of the vertical wall section 55C immediately above the inwardly-depressed, channel-shaped side bead 56C.

In the aforementioned manner, the third embodiment can reduce overlapping areas between the side sill 15C and the center pillar 17C, i.e. reduce closed sections of the side sill 15C, by reducing the vertical dimensions of the inner and outer wall sections 85C and 92C overlapping the side sill 15C, as long as predetermined performance, such as a strength of fixed joint between the side sill 15C and the center pillar 17C. As a result, it is possible to significantly reduce the weight of the vehicular side body structure and hence the vehicle.

Note that, whereas the outer side sill member 63, 63B, 63C has been described as having one downwardly-depressed, channel-shaped upper bead 54 formed in the upper wall section 51, 51C, two such downwardly-depressed, channel-shaped upper beads 54 may be formed in the upper wall section 51, 51C; in such a case, the respective widths W1 of the two upper beads 54 may be set as necessary.

Further, whereas the outer side sill member 63, 63B, 63C has been described as having one upwardly-depressed, channel-shaped lower bead 61 formed in the lower wall section 57, 57B, two such upwardly-depressed, channel-shaped lower beads 61 may be formed in the lower wall section 57, 57B; in such a case, the respective widths W2 of the two lower beads 61 may be set as necessary.

Furthermore, whereas the outer side sill member 63, 63B, 63C has been described as having one inwardly-depressed, channel-shaped side bead 56, 56B, 56C formed in the vertical wall section 55, 55B, 55C, two such inwardly-depressed, channel-shaped side beads 56, 56B, 56C may be formed in the lower wall section 55, 55B, 55C; in such a case, the respective widths W3 of the two side beads 56, 56B, 56C may be set as necessary.

The vehicular side body structure of the present invention is suited for application to side sills of vehicles.

What is claimed is:

1. A vehicular side body structure, comprising:
left and right side sills disposed on left and right side edge portions of a floor of a passenger compartment of a vehicle, left and right front pillars each extending from a front portion of the left or right side sill to a roof, left and right center pillars each extending from a middle portion of the left or right side sill to the roof,
each of the left and right side sills comprising an outer side sill member and an inner side sill member fixedly joined with each other such that the side sill has a closed sectional shape extending in a front-rear direction of the vehicle,
the outer side sill member including an upper wall section slanting upward in a horizontal, outer-to-inner direction of the passenger compartment, and a lower wall section slanting downward in the horizontal, outer-to-inner direction of the passenger compartment,
a bead formed in at least one of the upper and lower wall sections and extending from a front end to a rear end of the side sill, so that the side sill has a polygonal closed sectional shape extending in the front-rear direction of the vehicle, the bead being U-shaped in cross section defined by a pair of side wall portions joined by a bottom portion,
the bead having a width, which is a dimension between an outer end and an inner end of the bottom portion thereof, greater than a vertical dimension thereof in a direction orthogonal to a bottom surface of the bottom portion, wherein the bottom portion of the bead is generally parallel with the associated upper or lower wall section.

2. The vehicular side body structure of claim 1, wherein the bead formed in said at least one of the upper and lower wall sections has at least four edge lines.

3. The vehicular side body structure of claim 1, wherein the outer side sill member further has a side bead formed in a vertical wall section integral with the upper and lower wall sections and facing outwardly of the vehicle, the side bead extending from the front end to the rear end of the side sill so that the side sill has a multi-polygonal closed sectional shape extending in the front-rear direction of the vehicle.

4. The vehicular side body structure of claim 3, wherein each bead formed in said at least one of the upper and lower wall sections has at least four edge lines and the side bead formed in the vertical wall section has at least four edge lines.

5. The vehicular side body structure of claim 1, wherein the outer side sill member is formed of a high-tension steel plate.

6. The vehicular side body structure of claim 1, wherein the outer side sill member is formed to provide the polygonal closed sectional shape by roll forming or bend forming.

7. The vehicular side body structure of claim 1, wherein the bead formed in the at least one of the upper and lower wall sections of each of the side sills is in a form of a depressed wall portion of a generally channel sectional shape depressed toward an interior of the side sill, and a lower portion of at least one of the front pillar and the center pillar corresponding to the side sill overlaps the at least one of the upper and lower wall sections to close the depressed wall portion, so that the bead has a closed sectional shape.

8. The vehicular side body structure of claim 3, wherein the side bead formed in the vertical wall section of each of the side sills is in a form of a side depressed wall portion of a generally channel sectional shape depressed toward an interior of the side sill, and a lower portion of at least one of the front pillar and the center pillar corresponding to the side sill overlaps the vertical wall section to close the side depressed wall portion, so that the side bead has a closed sectional shape.

9. The vehicular side body structure of claim 1, wherein the upper wall section of the outer side sill member of each of the side sill members is positioned lower than an upper wall section of the inner side sill member, to thereby provide a stepped portion extending upward to a height position of the upper wall section of the inner side sill member.

10. A vehicular side body structure comprising:
left and right side sills disposed on left and right side edge portions of a floor of a passenger compartment of a vehicle, left and right front pillars each extending from a front portion of the left or right side sill to a roof, left and right center pillars each extending from a middle portion of the left or right side sill,
each of the left and right side sills comprising an outer side sill member and an inner side sill member fixedly joined with each other such that the side sill has a closed sectional shape extending in a front-rear direction of the vehicle, at least one of three sides of the outer side sill member, facing outside of the vehicle, having a channel-shaped bead formed therein and extending from a front end to a rear end of the side sill in parallel to an axis line of the side sill, the bead being in a form of a depressed wall portion of a generally channel sectional shape depressed toward an interior of the side sill or a bulged wall portion of a generally inverted-channel sectional shape protruded away from the interior of the side sill; and a plurality of bulkheads provided within each of the left and right side sills and spaced from each other in a front-rear direction of the side sill to partition the interior of the side sill, each of the bulkheads having a recessed edge portion or a protruded edge portion on one of edges thereof, each of the bulkheads being fixedly joined to the outer side sill member with the recessed edge portion or the protruded edge portion substantially fittingly engaging with and joined to a bottom portion of the depressed wall portion or the bulged wall portion of the outer side sill member.

11. The vehicular side body structure of claim 10, wherein the three sides of the outer side sill member are an upper wall section, a vertical wall section facing outwardly of the vehicle and a lower wall section, the one edge of each of the bulkheads being an outer vertical edge of the bulkhead, each of the upper wall section, the vertical wall section and the lower wall section having a respective bead in a form of a depressed wall portion of a generally channel sectional shape depressed toward the interior of the side sill, each of the bulkheads is fixedly joined to the outer side sill member 1) with the recessed edge portion substantially fittingly engaging with and joined to a bottom portion of the depressed wall portion of the vertical wall section and a remaining portion, other than the recessed edge portion, of the vertical edge of the bulkhead fixedly joined to a remaining portion, other than the depressed wall portion, of the vertical wall section, 2) with an upper edge of the bulkhead joined to a bottom portion of the depressed wall portion of the vertical wall section and 3) with a lower edge of the bulkhead joined to a bottom portion of the depressed wall portion of the lower wall section, an upper space being defined between the upper edge of the bulkhead and an outer end portion of the upper wall section located outwardly of the depressed wall portion of the upper wall section, a lower space being defined between the lower edge of the bulkhead and an outer end portion of the lower wall section located outwardly of the depressed wall portion of the lower wall section.

12. The vehicular side body structure of claim 10, wherein each of the bulkheads has a sectional shape gradually widening in an horizontal, outer-to-inner direction of the passenger compartment.

13. A vehicular side body structure, comprising:
left and right side sills disposed on left and right side edge portions of a floor of a passenger compartment of a vehicle, left and right front pillars each extending from a front portion of the left or right side sill to a roof, left and right center pillars each extending from a middle portion of the left or right side sill to the roof;
each of the left and right side sills comprising an outer side sill member and an inner side sill member fixedly joined with each other such that the side sill has a closed sectional shape extending in a front-rear direction of the vehicle;
the outer side sill member including an upper wall section slanting upward in a horizontal, outer-to-inner direction of the passenger compartment, a lower wall section slanting downward in the horizontal, outer-to-inner direction of the passenger compartment, and a vertical wall section integral with the upper and lower wall sections and facing outwardly of the vehicle;
a first bead formed in at least said upper wall section and extending from a front end to a rear end of the side sill, the first bead being U-shaped in cross section defined by a pair of side wall portions joined by a bottom portion, the first bead having at least four edge lines;
a second bead formed in said vertical wall section and extending from the front end to the rear end of the side sill, so that the side sill has a multi-polygonal closed sectional shape extending in the front-rear direction of the vehicle, the second bead being U-shaped in cross section defined by a pair of side wall portions joined by a bottom portion, the second bead having at least four edge lines;
the first and second beads each having a width, which is a dimension between an outer end and an inner end of the bottom portion thereof, greater than a vertical dimension thereof in a direction orthogonal to a bottom surface of the bottom portion;
the first bead formed in at least said upper wall section of each of the side sills being in the form of a depressed wall portion of a generally channel sectional shape depressed toward an interior of the side sill, and at least one of the front pillar and the center pillar corresponding to the side sill having a lower portion overlapping the upper wall section to close the depressed wall portion, so that the first bead has a closed sectional shape; and
the upper wall section of the outer side sill member of each of the side sill members being positioned lower than an upper wall section of the inner side sill member, to thereby provide a stepped portion extending upward to a height position of the upper wall section of the inner side sill member.

14. The vehicular side body structure of claim 13, wherein the second bead formed in the vertical wall section of each of the side sills being in the form of a depressed wall portion of a generally channel sectional shape depressed toward an interior of the side sill, and the lower portion of said at least one of the front pillar and the center pillar overlaps the vertical wall section to close the depressed wall portion, so that the second bead has a closed sectional shape.

* * * * *